United States Patent [19]

Aldous

[11] Patent Number: 5,638,540
[45] Date of Patent: Jun. 10, 1997

[54] PORTABLE COMPUTER/RADIO POWER MANAGEMENT SYSTEM

[75] Inventor: Steven C. Aldous, Salt Lake City, Utah

[73] Assignee: U.S. Robotics Mobile Communication Corp., Salt Lake City, Utah

[21] Appl. No.: 384,357

[22] Filed: Feb. 2, 1995

Related U.S. Application Data

[63] Continuation of Ser. No. 73,704, Jun. 8, 1993, abandoned.

[51] Int. Cl.$^6$ ........................................... G06F 17/00
[52] U.S. Cl. ............................... 395/750; 364/707
[58] Field of Search ............... 320/5, 6, 15; 395/750; 364/707; 370/94.1

[56] References Cited

U.S. PATENT DOCUMENTS

| | | | |
|---|---|---|---|
| 3,740,569 | 6/1973 | Carcia | 307/11 |
| 4,040,247 | 8/1977 | Haydon | 368/156 |
| 4,096,439 | 6/1978 | Hochstein | 455/73 |
| 4,497,036 | 1/1985 | Dunn | 364/708.1 |
| 4,600,212 | 7/1986 | Knabel | 307/116 |
| 4,614,880 | 9/1986 | Go et al. | 307/592 |
| 4,667,299 | 5/1987 | Dunn | 364/708.1 |
| 4,694,237 | 9/1987 | Hanson | 320/6 |
| 4,775,827 | 10/1988 | Ijntema et al. | 320/5 |
| 4,785,228 | 11/1988 | Goddard | 322/29 |
| 4,881,205 | 11/1989 | Aihara | 365/222 |
| 4,887,265 | 12/1989 | Felix | 320/94.1 |
| 4,922,450 | 5/1990 | Rose et al. | 395/750 |
| 4,963,811 | 10/1990 | Weber | 320/1 |
| 5,031,098 | 7/1991 | Miller et al. | 364/405 |
| 5,047,961 | 9/1991 | Simonsen | 320/6 |
| 5,065,321 | 11/1991 | Bezos et al. | 364/424.04 |
| 5,167,024 | 11/1992 | Smith et al. | 395/375 |
| 5,218,285 | 6/1993 | Carlton et al. | 320/15 |
| 5,250,891 | 10/1993 | Glasgow | 320/15 |
| 5,254,929 | 10/1993 | Yang | 320/15 |
| 5,325,041 | 6/1994 | Briggs | 320/44 |
| 5,345,392 | 9/1994 | Mito et al. | 364/483 |

FOREIGN PATENT DOCUMENTS

| | | | |
|---|---|---|---|
| 6317918 | 2/1989 | Japan . | |
| 6312365 | 7/1989 | Japan | G06F 1/00 |

*Primary Examiner*—Jack B. Harvey
*Assistant Examiner*—Paul R. Myers
*Attorney, Agent, or Firm*—Workman, Nydegger & Seeley

[57] ABSTRACT

An electrical power management system for supplying power to a computer peripheral having a relatively high intermittent power demand, such as a packet-switched data radio. A first self-contained rechargeable power supply, outputting power appropriate for the electrical appliance, stores electrical energy and supplies power to the appliance. A second self-contained rechargeable power supply stores electrical energy and supplies electrical power to intermittently recharge the first power supply. The first and the second power supplies can be such self-contained units as single or multicell batteries or capacitors. Preferably, the first power supply is a battery or a capacitor and the second power source is an internal power supply of a portable personal computer.

65 Claims, 4 Drawing Sheets

PORTABLE COMPUTER/RADIO POWER MANAGEMENT SYSTEM

This application is a continuation of U.S. application Ser. No. 08/073,704, filed Jun. 8, 1993, for PORTABLE COMPUTER/RADIO POWER MANAGEMENT SYSTEM, now abandoned.

BACKGROUND

1. Field of the Invention

The present invention relates to a power distribution and management system for use in a portable computer and packet-switched data radio combination.

2. Background Art

Power consumption in an electronic device is typically of significant concern as a power supply must be designed to adequately power the device and, where the power supply of the electronic device is powered up by a rechargeable battery, the battery life should preferably be as long as is reasonably practical. The practical aspect of battery life is particularly seen in laptop, palmtop and other portable computers wherein the power supply constitutes a major contribution to the overall size and weight of the portable computer. Aside from the capability of the power supply to supply ample power for the portable computer, heat dissipation, physical size, efficiency and other related characteristics are also important in designing or selecting the power source. All these factors become exceptionally important and perhaps even critical when designing a portable computer such as a laptop computer.

In typical portable computers, a battery is used to provide the power thereto when the portable computer is disconnected from an external power source. The battery provides auxiliary power to maintain certain critical circuits active, such as keeping the memory alive so as to retain any information stored therein. The battery must also function as the main power source to fully power the portable computer for a number and variety of power consuming functions. These functions merit additional power consumption rate considerations. For example, ROM and RAM memory devices, which include volatile and nonvolatile memories, diskette drives, hard disk drives, and display screens, all typically require a stable power source.

In the design of a power supply system for a portable computer, the objective to be maximized is to extend the self-sustaining time period during which the portable computer may be used, while the constraint to be minimized is the size and weight of the battery and power supply circuitry thereof. Sophisticated power management systems have been developed to provide power only to those circuits and devices which require such power and to remove power, or at least to cause a given circuit to enter a low power consumption mode, when that circuit is not needed. Such management systems must also continually monitor all the various circuits and devices in order that power can be applied immediately to activate such circuits and devices when needed.

An additional frontier in portable computing is the object of providing a variety of modular tools to be employed by the user so as to be, in effect, a mobile office. Such tools, which are added on to the portable computer in modules, comprise ever more sophisticated software such as spread sheets, contact managers, personal information managers, various business and industrial applications software, and general purpose word processors having both a dictionary and a thesaurus. The modular tool by which the increasing sophistication of the software is accommodated is ever more powerful processors such as those known in the art as the 386, the 486 and the 586 microprocessors.

To further expand the goal of achieving a mobile office environment, and in addition to software and the hardware therefor, portable computers are being modularly coupled with a variety of peripherals. Adding a modular peripheral to the portable computer is desirable because such a peripheral is conventional and perhaps essential in a typical office environment. By making the peripheral a modular addition to the portable computer, the resultant essentially singular unit is both compact and convenient. Peripherals that have been modularized include devices such as modems, telefacsimile machines, printers and packet-switched data radios.

As the goal of creating a mobile office environment in a modularized portable computer is increasingly realized, the power consumption requirements will concomitantly increase as well. Despite the advantages of lower power consumption in large scale integration and the electrical efficiency achieved in semiconductor technology, power management in portable computers remains an obstacle.

Particularly acute in power consumption management design is the overall size and weight of the portable computer plus the attached modular peripherals. The combined weight of each battery which supplies power to each respective peripheral module makes a significant contribution to the overall weight. The main power supply supplying power to the portable computer typically has a limited power output. For example, the maximum current output by a portable computer for purposes of powering an attached modular peripheral is generally between 30 milliamps and 1 amp.

In contrast, the power requirements for an attached modular peripheral may be significantly different. Most portable computers could not ordinarily supply enough power to peripherals with high power consumption requirements. An example of such a peripheral is the transmitter component of a packet-switched data radio. Packet-switched data radios place certain requirements on their power supplies. When transmitting, packet-switched data radios require a relatively high amount of power. At other times, such as when the radio is receiving data or is idle, the radio produces a relatively low drain on the power supply.

A typical solution to such a problem would be to provide a separate battery or other rechargeable power supply capable of providing to that peripheral a higher power output than that which the battery powered power supply of the portable computer is capable of providing. However, the use of separate batteries for the various peripheral modules on the portable computer increases both the overall size and weight of the portable computer/peripheral combinations. Furthermore, use of a separate secondary battery for the peripheral requires the user to worry about keeping both the main computer battery and the separate peripheral secondary battery charged. Not only must both the primary and the secondary battery remain charged, but separate charging equipment must accompany each battery when the portable computer is taken off-site. Not only must the user contend with the transportation of the extra charging equipment, but the user must also monitor the disparity in the charges of the two batteries. For example, if the peripheral device is used heavily, the battery supplying the power to the peripheral device may require charging earlier than the primary computer battery. As a result, the laptop, although fully charged, may become functionally useless because of the inability of the peripheral device to function properly. Conversely, heavy use of the computer may result in a discharged primary computer battery, thereby rendering the computer non-functional despite a full charge in the secondary peripheral battery.

Another obstacle in the past is that it is relatively difficult to monitor when a rechargeable battery is fully charged. In typical recharging circuits found in the prior art, the temperature rise of the battery is monitored until the battery temperature reaches a level indicating a fully charged condition, signalling that it is time to stop (or at least slow to a minimum) the recharging process. Such an approach is, however, a very energy inefficient process and often drains much more energy out of the system than it puts back into the rechargeable battery as useful energy.

BRIEF SUMMARY AND OBJECTS OF THE INVENTION

In accordance with the present invention, as embodied and broadly described herein, the present invention comprises an electrical power management system. The system includes an electrical appliance which has a relatively high intermittent power demand. A first self-contained rechargeable power supply, outputting power appropriate for the electrical appliance, stores electrical energy and supplies power to the appliance. A second self-contained rechargeable power supply stores electrical energy and supplies electrical current to intermittently recharge the first power supply. The first and the second power supplies can be such self-contained units as single or multicell batteries or capacitors. Preferably, the first power supply is a battery or a capacitor and the second power source is a battery.

The system uses a voltage converter switch means for switching electrical current output from the second power supply to the first power supply and for converting the voltage output by the second power supply to the voltage output by the first power supply so as to recharge the first power supply. The voltage conversion is done via a DC-to-DC converter circuit comprised of a field effect transistor, an inductor, diodes, and capacitors. A processor, is used to control the recharging of the first power supply.

The processor performs a set of programmed steps in order to manage the recharging function of the first power supply. Particularly, whenever the peripheral is initially powered up, the processor derives an electrical energy level stored in the first power supply. If the energy level of the first power supply is below a predetermined level, then the processor will initiate the partial recharging process.

To initiate the partial recharging of the first power supply, the processor will activate the voltage converter switch to switch current output from the second rechargeable power supply to the first power supply. Once the first power supply is recharged to above the predetermined energy level the processor will stop the recharging process. The energy level of the first power supply is detected by momentarily placing a test load on the first power supply and then measuring the voltage level of the first power supply.

The first power supply is then partially recharged to at least the energy level possessed prior to the test.

In order to stop the recharging process, when the processor detects that the first power supply has been recharged to above the predetermined energy level, the processor deactivates the voltage converter switch to stop current output from the second power supply to the first power supply.

Once the initial recharging has been completed, then the processor controls the recharging functions to recharge the first power supply each time the appliance draws power from the first power supply so as to restore to the first power supply an amount of electrical energy that is equal to or slightly greater than the amount of electrical energy consumed by the appliance. To accomplish this, the processor monitors the amount of power consumed by the appliance, computes the amount of recharging time and power needed for the second power supply to recharge the first power supply so as to replace the energy consumed by the appliance and then activates the voltage converter switch to switch current output from the second power supply to the first power supply for a period of time equal to the recharging time computed by the processor.

The processor also periodically monitors the voltage level of the second power supply and adjusts the recharging circuits whenever the voltage level of the second power supply drops below a predetermined level. In this manner, the processor can prevent the recharging circuits from overloading the second power supply.

Alternatively, the first and second power supplies can be one or more AC power supplies with appropriate circuitry to convert the AC power source to the proper DC voltages required.

From the foregoing it will be appreciated that an object of the invention is to provide a rechargeable battery or rechargeable power supply that would have sufficient power capacity to supply the electrical power needs of its corresponding peripheral, yet be small, lightweight and quickly rechargeable by the main power supply of a battery powered portable computer without placing an undue burden on the main power supply.

Another object of the invention is to provide an electrically efficient DC-to-DC recharging circuit powered by a lower power, battery powered power supply to recharge a higher power battery or capacitor powered power supply.

It is a further object of the invention to provide a rechargeable battery or rechargeable power supply that would have sufficient power capacity to supply the electrical power needs of a packet-switched data radio, yet be small, lightweight and rechargeable by the main power supply of a battery powered portable computer without placing an undue burden on the main power supply.

Yet another object of the invention is to provide a rechargeable battery or rechargeable power supply for a packet-switched data radio that is rechargeable by either the power supply of a battery powered portable computer or by an external AC power source.

A still further object of the present invention is to provide an efficient means for testing the status of the rechargeable battery by detecting the level of energy stored in the rechargeable battery.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order to completely understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

The present invention consists of a novel power supply and power management module that is capable of supplying power to computer peripherals that require higher peak power than the main power supply of a portable computer can handle, yet is rechargeable by the main power supply of the portable computer without placing an undue burden on the computer's power supply. While the following detailed description is directed to a particular embodiment of the present invention adapted to supply power to a packet-switched data radio in combination with a portable personal computer, it should be understood that application of the present invention is not limited to a personal computer/pocket switched data radio combination. The present invention can be adapted for use with a personal computer and any associated peripheral or appliance that has peak power consumption requirements that exceed the capability of power supplies typically used in portable personal computers.

Packet-switched data radios transmit data in bursts or pulses each of which contains a packet of data. During the transmission of a data packet, the radio uses a relatively high amount of electrical energy over a relatively short period of time. At other periods, particularly when the radio is idle or is in the data receiving mode, the electrical energy used by the radio is substantially lower as compared to that used during the transmission mode. For example, during transmission cycles the radio may require as much as 2 amps of current, whereas it may only require 50–100 milliamps during reception cycles and less than 50 milliamps when idle (e.g., when the radio is on but is neither transmitting nor receiving data.)

As discussed in more detail below in relation to FIG. 4, due to the fact that the radio transmits data in packets or pulses that are relatively short (e.g., 0.1 to 1 second in duration) as compared to the time separating successive transmission pulses (e.g., 3 seconds or more), the relatively low power output of the computer's power supply can provide sufficient power to supply the average power requirements of the radio transmitter.

Figure 1:
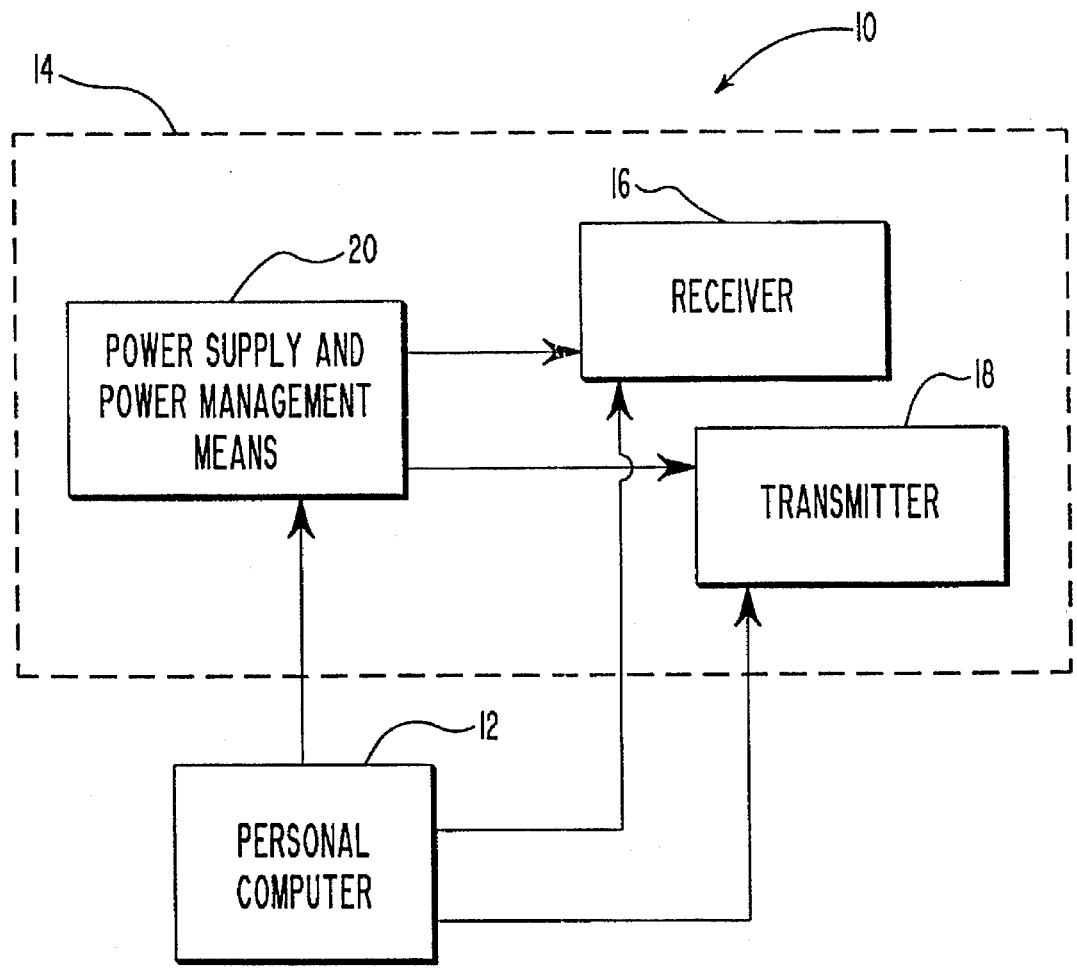
FIG. 1 is a functional block diagram of the present invention.

Referring to FIG. 1, the present invention 10 comprises a personal computer 12 in combination with a radio 14. Radio 14 is preferably a packet-switched data radio adapted to transmit and receive data packets over radio waves. Radio 14 could also comprise a conventional cellular radiotelephone that combines transmission and reception of both voice and data signals. By integrating radio 14 with personal computer 12, it is possible to transmit and receive data from and to personal computer 12 without the necessity of connecting the computer to a telephone land line, as is the case with the use of a conventional modem, thereby dramatically enhancing the ease of data exchange to and from personal computer 12. As will be appreciated, these advantages are most significant in relation to portable personal computers, since access to a telephone land line is usually readily available in most environments in which a desk top computer is used.

Radio 14 can be either an internal radio that forms an integral part of personal computer 12 or it can be a separate device that is external to, and interfaces with, personal computer 12 through input/output ports conventionally incorporated into most personal computers. In either event, radio 14 interfaces with personal computer 12 for transmission of data output by personal computer 12 and input of data received by radio 14 to personal computer 12. Radio 14 comprises a receiver 16, a transmitter 18 and a power supply and power management module 20.

As discussed above, one of the problems inherent with combining a packet-switched data radio 14 with a portable, battery powered personal computer is the fact that the peak power requirements of such radios during transmission of data packets exceed the power available from most portable personal computers. For example, portable personal computers typically provide power to operate peripherals at 5 volts and within the range of 30 milliamps to 1 amp through a PCMCIA or similar connector incorporated into many portable computers. In contrast, the transmitter of a packet-switched data radio typically operates at 6 volts or higher and requires up to 2 amps of current during transmission cycles.

Figure 2:
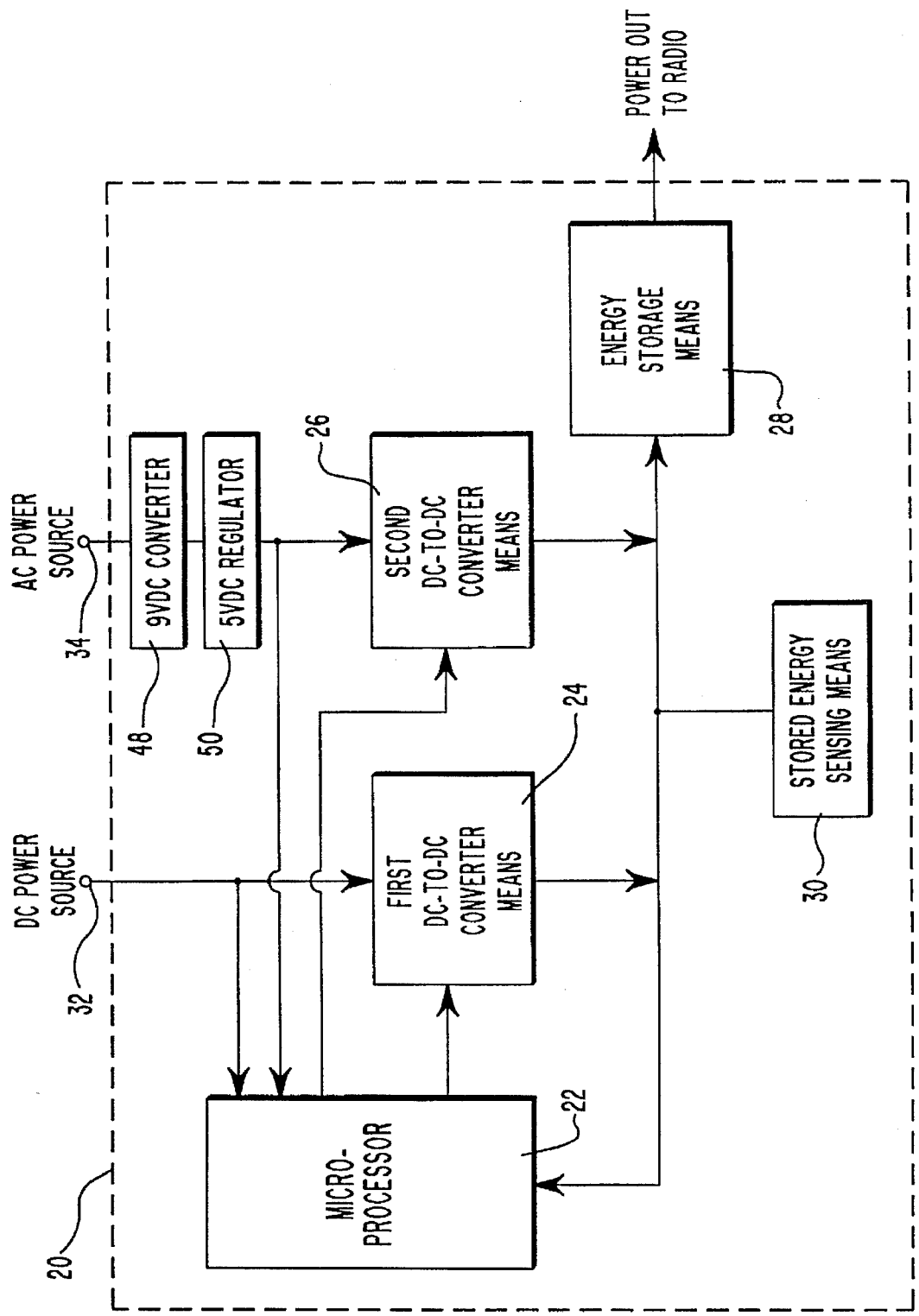
FIG. 2 is a functional block diagram of the power supply and power management module.

The present invention solves this dilemma through the use of a novel power supply and power management module 20. Referring to FIG. 2, module 20 comprises a programmable control means 22, a first converter means 24, a second converter means 26, an energy storage means 28 and a stored energy sensing means 30. In the preferred embodiment, control means 22 comprises a programmable microprocessor that is separate from the processor that is part of personal computer 12. However, advances in the art of modern electronic devices may allow the processor of personal computer 12 to carry out internally many of the functions carried out by microprocessor 22. In the preferred embodiment, first converter means 24 and second converter means 26 each comprise a DC-to-DC converter. In the preferred embodiment, energy storage means 28 comprises a small, lightweight battery with relatively high power capacity. Alternatively, energy storage means 28 could comprise a capacitor (not shown) of sufficient size and power to provide the anticipated transmitter power requirements of radio 14.

Module 20 derives its power from two sources. The first power source is a DC power source 32. In the preferred embodiment, DC power source 32 comprises a DC power output from personal computer 12 and, more particularly, a DC power output available on a conventional PCMCIA card (not shown) that is a conventional and integral part of many contemporary portable personal computers.

As will be appreciated, the DC output of a PCMCIA card of a portable personal computer is powered by the main power supply of the personal computer. Power supplies typically used in portable personal computers generally do not have sufficient peak power capacity to supply the level of power needed to power a packet-switched data radio during its transmission cycles. The DC output of a PCMCIA card is generally 5 volts and is capable of supplying continuous current in the range of from 30 milliamps to 1000 milliamps. Although it is conceivable that the DC output of a PCMCIA card might be able to supply peak current approaching that required by radio 14 during transmission cycles, it may cause such a drop in voltage as to endanger the proper operation of personal computer 12. However, the level of power available from the DC output of most PCMCIA cards is generally sufficient to supply the average power requirements of a radio 14.

Module 20 also derives power from an AC power source 34. AC power source 34 can either be the same AC power source utilized by personal computer 12 or some other independent AC power source. As explained in more detail below, all of the components of module 20 derive their power from DC power source 32, AC power source 34, and/or its internal battery 28.

Figure 3:
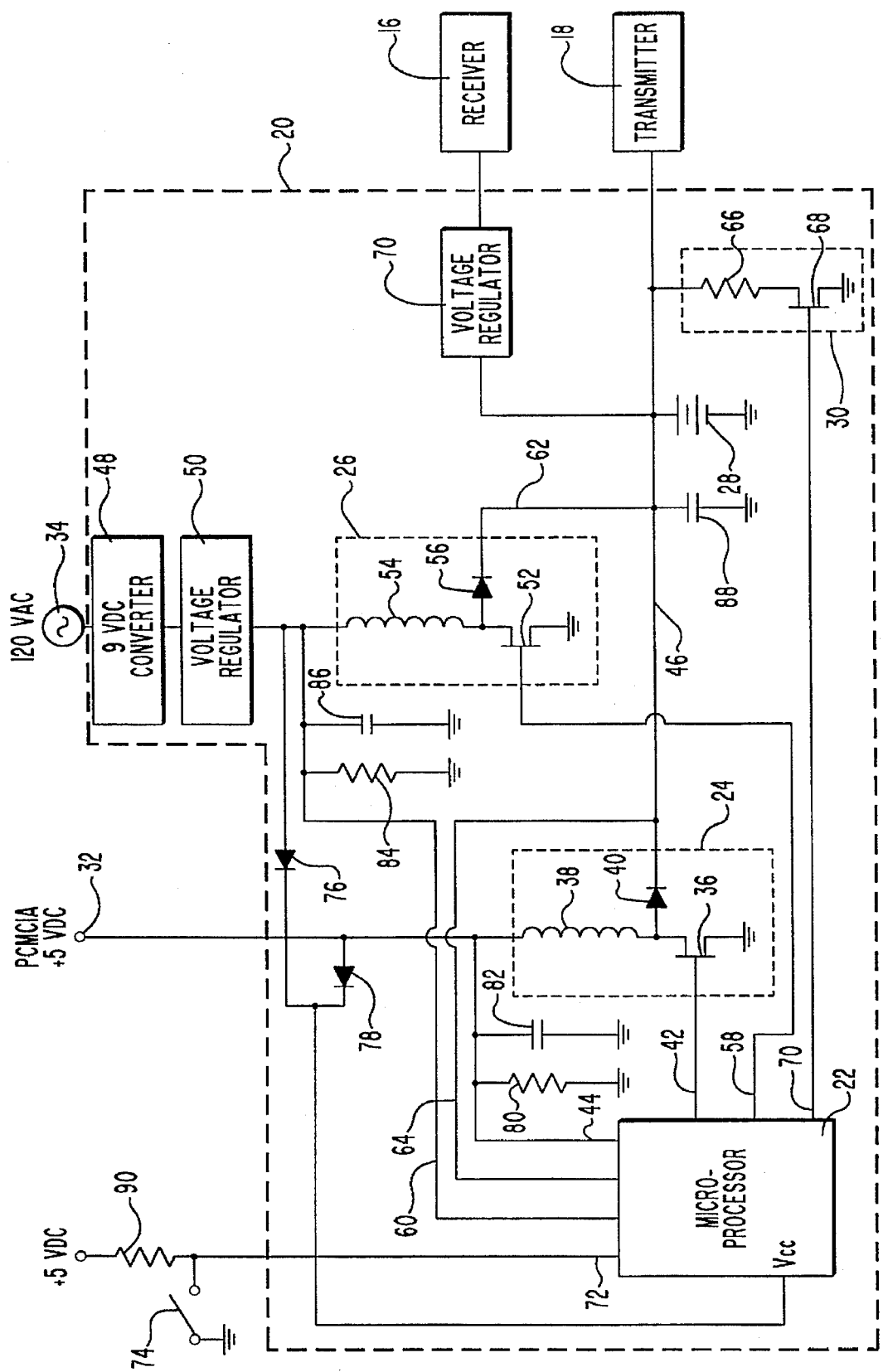
FIG. 3 is a schematic of the of the power supply and power management module.

Referring to FIGS. 2 and 3 together, DC power source 32 is coupled to first DC-to-DC converter 24, which comprises a field effect transistor ("FET") 36, an inductor 38 and a diode 40. The gate of FET 36 is electrically coupled to, and controlled by, a first output 42 of microprocessor 22. A first input 44 to microprocessor 22 is also coupled to DC power source 32 to detect the presence or absence of power from DC power source 32. In the preferred embodiment, when microprocessor 22 detects that DC power source 32 is supplying power to module 20 and microprocessor 22 detects that battery 28 needs charging, output 42 of microprocessor 22 drives the gate of FET 36 with a 50 kilohertz pulse width modulated ("PWM") wave, which causes current to flow through inductor 38 and FET 36 while the signal on line 42 is at a high asserted level (5 volts). When the input at the gate of FET 36 goes to a low asserted level, the current flowing through inductor 38 is diverted through diode 40, which is coupled through line 46 to battery 28, thereby charging battery 28.

When an AC power source is used, power management module 20 can contain means for converting power derived from the AC power source. In FIGS. 2 and 3, the means for converting power derived from the AC power source comprise 9 volt DC converter 48 and voltage regulator 50. The voltage regulator 50 is coupled to second DC-to-DC converter 26. Converter 26 comprises a FET 52, an inductor 54 and a diode 56. The gate of FET 52 is coupled to and controlled by a second output 58 of microprocessor 22. A second input 60 to microprocessor 22 is also coupled to the output of voltage regulator 50 to detect the presence or absence of power from AC power source 34.

In the preferred embodiment, when microprocessor 22 detects that AC power source 34 is supplying power to module 20 and microprocessor 22 detects that battery 28 needs charging, output 58 of microprocessor 22 drives the gate of FET 52 with a 50 kilohertz PWM wave, which causes current to flow through inductor 54 and FET 52 while the signal on line 58 is at a high asserted level.

When the input at the gate of FET 52 goes to a low asserted level, the current flowing through inductor 54 is diverted through diode 56, which is coupled through line 62 to energy storage means 28, thereby charging energy storage means 28. Converters 24 and 26 also convert the voltage level from 5 volts to 6 volts. Schottky diodes 40 and 56 also prevent current from flowing back into either converter 24 or 26.

Energy storage means 28 may comprise a 6 volt battery with relatively high peak power capacity. In the preferred embodiment, energy storage means 28 comprises a battery having a peak current capacity of at least 2 amps, being capable of delivering sufficient power to operate radio transmitter 18 for relatively short periods of time and being capable of recharging in a relatively short period of time, preferably in the time between successive transmission cycles. When storage means 28 comprises a battery, it is desirable to include capacitor 88 as shown in FIG. 3 so as to help filter the charging current on line 46.

Alternatively, energy storage means 28 can comprise a capacitor (not shown) in place of the battery shown at 28 in FIG. 3. The capacitor should be of sufficient voltage rating and peak power capacity to power transmitter 18. Since the energy storage per unit volume (E/V) in a capacitor is greatest when the capacitor voltage is high, the size of the capacitor could be reduced by using a DC-to-DC converter (not shown) to convert the voltage from the computer (typically 5 volts) to a much higher voltage (e.g., 60 volts), charging the capacitor with the higher voltage, and using another DC—DC converter (not shown) to convert the capacitor voltage back down to the voltage of the radio (e.g., 6 volts).

Module 20 also incorporates circuitry to monitor the stored energy level or charge of battery 28 and to charge battery 28 when the level of energy stored in battery 28 is below a certain minimum threshold level, which is too low for radio transmission. This is accomplished under the control of microprocessor 22 in combination with stored energy sensing means 30. In the preferred embodiment, stored energy sensing means 30 comprises resistor 66 and FET 68. Stored energy sensing means 30 and a third input 64 to microprocessor 22 are both coupled to line 46, which, in turn is coupled to battery 28. The gate of FET 68 is coupled to, and controlled by, a third output 70 of microprocessor 22. Microprocessor 22, under the control of its programming, measures or derives the electrical energy level stored in battery 28 whenever the radio is turned on (e.g., the radio power switch 74 is switched from the "off" position to the "on" position).

When microprocessor 22 applies a voltage to the gate of FET 68 through line 70, a test load (resistor 66) is placed on line 46, which causes a voltage drop on line 46. It will be appreciated that the amount of voltage drop on line 46, which is detected by microprocessor 22 through input 64, will be proportional to the level of electrical energy stored in battery 28. If the stored energy level of the battery 28 is below the threshold level required to power transmitter 18, microprocessor 22 initiates the recharging process by enabling converter 24 and/or converter 26 through output lines 42 and/or 58, respectively. As soon as microprocessor 22 detects that battery 28 has been charged to the point where the stored energy level of battery 28 exceeds the minimum threshold level, microprocessor 22 disables converter 24 and converter 26 so that no further charging of battery 28 occurs.

After the initial recharging has been completed, microprocessor 22 controls the recharging function of module 20 to recharge battery 28 after each transmission cycle of radio 14 so as to restore energy to battery 28 in an amount equal to or slightly greater than the amount of energy consumed by radio 14 during such transmission cycle. By monitoring the amount of energy consumed by radio 14 during each transmission cycle, microprocessor 22 can compute the amount of time and power that is necessary for the recharging circuits of module 20 to recharge battery 28 to a stored energy level equal to or slightly greater than its stored energy level immediately prior to the preceding transmission cycle. Microprocessor 22 then enables converter 24 and/or 26 through lines 42 and/or 58, respectively, to charge battery 28 for the amount of time and power computed by microprocessor 22.

As further shown in FIG. 3, battery 28 is coupled to and supplies power to radio transmitter 18. Battery 28 is also coupled to voltage regulator 71, which steps down the voltage from 6 VDC to 5 VDC, and the output of voltage regulator is coupled to and supplies power to radio receiver 16.

As alluded to above, microprocessor 22 is programmed to monitor the status of, and control the various components of module 20. Microprocessor 22 derives its power from either the 5 volts from DC power source 32 (the PCMCIA connector [not shown] of personal computer 12) or the regulated 5 volts derived from AC power source 34. Schottky diodes 76 and 78 prevent current from flowing back into either power source. Once microprocessor 22 powers up, it determines where the power is coming from and tests the state of the radio power switch 74 (a slide switch on the side of the radio), which microprocessor 22 detects through a fourth input 72. Microprocessor 22 then performs the following functions, depending on the state of radio power switch 74 and the state of module 20, which microprocessor 22 monitors through input lines 44, 60, 64:

TABLE I

| Radio "On" | AC Power | PCMCIA Power | Action |
|---|---|---|---|
| YES | YES | X | After boot up, put dummy load on battery, observe voltage drop and estimate battery capacity. Recharge battery, if necessary, from AC power source. Fast, then trickle charge battery. |
| YES | NO | YES | Same as above, but charge battery from PCMCIA power source. Replace energy used in transmissions as necessary. |
| YES | NO | NO | Do nothing (processor will be dead). |
| NO | YES | X | Charge battery (fast at first, then trickle) from AC power source. |
| NO | NO | X | Do nothing. |

In Table I, the symbol "X" represents a "Don't Care" condition.

Microprocessor 22 is programmed to monitor inputs 44, 60, 64 and 72 and to control FETs 36, 52 and 68 through output lines 42, 58 and 70, respectively, in accordance with the truth table set forth above. For example, if the radio is turned on and if power is being supplied to module 20 by either DC power source 32 or AC power source 34, then microprocessor 22 will recharge battery 28 as necessary. Microprocessor 22 also determines which power source to use to recharge battery 28. In one preferred embodiment line 60 is provided with resistor 84, capacitor 86 and capacitor 88 connected in parallel with battery 28.

For example, any time microprocessor 22 detects through input line 60 that AC power source 34 is active and supplying power to module 20, microprocessor 22 will use AC power source 34 (instead of DC power source 32) to recharge battery 28, when necessary, and will take line 42 low, thereby disabling FET 36, so that DC power source 32 (which derives its power from the main battery of computer 12) is not drained needlessly. The only time DC power source 32 is used to recharge battery 28 is when the radio power switch is in the "on" position, microprocessor 22 detects through input line 44 that DC power source 32 is active supplying power to module 20, and microprocessor 22 detects through input line 60 that AC power source 34 is inactive (e.g., no power is being supplied to module 20 by AC power source 34).

When the radio transmitter is turned on, the circuitry allows battery 28 capacitor (now shown) to be "initialized." This initialization comprises charging battery 28 according to some predetermined criteria. For example, micro processor 22 can charge battery 28 for a predetermined time. The charging criteria can also include various types of monitoring. As an additional example, micro processor 22 can charge battery 28 until a predetermined energy level is reached. Alternately, micro processor 22 can first measure how much energy is currently stored in battery 28 and then charge battery 28 until it contains a sufficient amount of energy to perform some desired task. As a third alternative, micro processor 22 can initialize battery 28 to a relatively low energy level sufficient to transmit a few packets. This will avoid initial drain on the internal power supply of the computer. After transmission of the packets begins, battery 28 can be further charged to a predetermined energy level. This will ensure sufficient energy is always stored in batter 28 to accomplish its designed task.

Whenever the radio is turned off, there will not be any appreciable drain on battery 28. In that case, since there is no need to test the stored energy capacity of battery 28 until the radio is turned back on, microprocessor 22 will take output line 70 low (and keep it at a low asserted level until the radio is switched on), thereby disabling FET 68.

Microprocessor 22 also monitors the status of the DC power source 32 and adjusts converter 24 if the voltage level of the DC power source 32 ever drops below a predetermined lower limit. During the normal operation of personal computer 12, varying loads are placed on the computer's power supply as various internal components of the computer are activated or deactivated in various combinations. By sensing the voltage level of DC power source 32 through input line 44, microprocessor 22 can determine the load on the power supply of personal computer 12 at any point in time and adjust the additional load added by recharging battery 28 so as to not threaten the proper operation of computer 12.

Figure 4:
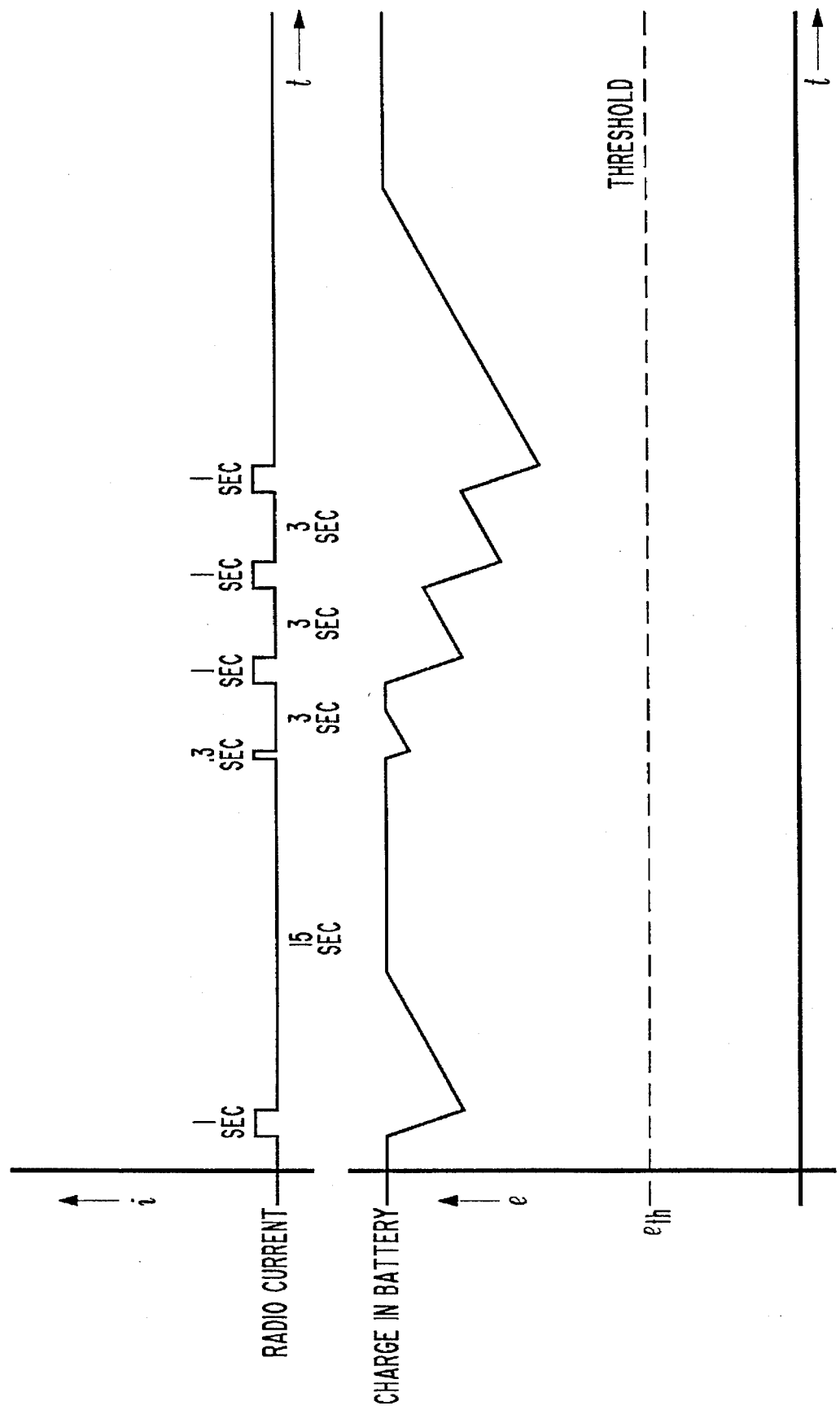
FIG. 4 is a chart comparing radio current to the charge stored in the energy storage device of the present invention.

Reference is now made to FIG. 4, which compares the radio current to the stored energy of battery 28 during transmission of a succession of data packets. As graphically depicted in the top line of the graph of FIG. 4, the duration of individual transmission pulses in packet-switched data radios typically range from approximately 0.1 to approximately 1 second, and the space of time separating successive transmission pulses is typically no less than 3 seconds. During transmission each successive data packet, radio transmitter 18 draws current from battery 28, which, as graphically represented in FIG. 4, reduces the energy stored in battery 28. However, the energy stored in battery 28 is replenished through the recharging circuits described above during the times separating successive transmissions.

As depicted by the lower line of the graph of FIG. 4, the rate at which the energy stored in energy storage means 28 is reduced during transmission is generally greater than the rate at which the energy is replenished between transmissions. However, the relatively short duration of the pulses as compared to the relatively long separation of successive transmission pulses makes it possible for personal computer 12 to supply sufficient current to maintain the energy stored in battery 28 to a sufficient level to operate radio 14.

Furthermore, the energy stored in battery 28 is maintained at a level well above the minimum threshold level, designated as e in FIG. 4, required to power radio transmitter 18. In the event the level of energy stored in energy storage means 28 is ever depleted to the point that it approaches e, then microprocessor 22 prevents any further radio transmissions until such time as battery 28 has been recharged to a sufficient level to permit further radio transmissions to occur. Microprocessor 22 may also provide a visible and/or audible signal to warn the user of the low charge condition of battery 28.

Another embodiment of the present invention overcomes the need to determine the amount of power utilized in the transmission of a packet and then recharging the battery at least as much as, or a little more than that amount, by consistently recharging the radio battery by a predetermined amount after each transmission. This predetermined amount is derived from the greatest energy drain anticipated from the transmission of the packet of data. By consistently recharging the battery with this predetermined amount, this embodiment of the present invention does not need to monitor the amount of energy utilized during the transmission of each packet. It will be understood, that while this embodiment is more simplistic, it is not as efficient as custom tailoring each recharge amount to the energy lost from the transmission of each individual packet.

From the foregoing, it will be appreciated that the present invention provides a rechargeable power supply that has sufficient power capacity to supply the electrical power needs of its corresponding peripheral, yet be small, lightweight and rechargeable by the main power supply of a battery powered portable computer without placing an undue burden on the main power supply of the portable computer.

The present invention also provides an electrically efficient DC-to-DC recharging circuit powered by a lower power, battery powered power supply to recharge a higher power, battery or capacitor powered power supply.

The present invention further provides a rechargeable power supply that would have sufficient power capacity to supply the electrical power needs of a packet-switched data radio, yet be small, lightweight and rechargeable by the main power supply of a battery powered portable computer without placing an undue burden on the power supply of the portable computer.

The present invention provides a rechargeable battery or capacitor powered power supply for a packet-switched data radio that is rechargeable by either the main power supply of a battery powered portable computer or by an external AC power source.

The present invention also provides an efficient means for testing the status of the rechargeable battery by detecting the level of energy stored in the rechargeable battery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States patent is:

1. An electrical power management element comprising:
 radio transmitter means for transmitting packets of data;
 first power supply means, rechargeable, for storing electrical energy and supplying power to the radio transmitter means;
 second power supply means, self-contained, for storing electrical energy and supplying electrical current to recharge the first power supply means;
 means for switching electrical current output from the second power supply means to the first power supply means so as to recharge the first power supply means;
 means for controlling the recharging of the first power supply means by performing a set of programmed steps comprising:
 detecting the transmission of a packet of data by the radio transmitter means; and
 activating the switch means to switch power output from the second power supply means to the first power supply means to charge the first power supply means by an amount substantially equal to the discharge occurring during the previous transmission of the packet of data, to thereby preserve the energy in the second power supply means by replacing only the energy used by the first power supply means during the previous transmission and not fully recharging the first power supply means after every transmission.

2. A system as defined in claim 1, wherein the first power supply means comprises a first rechargeable battery.

3. A system as defined in claim 1 wherein the second power supply means comprises the internal power supply of a portable computer.

4. A system as defined in claim 1 wherein the step of activating the switch means further comprises the step of recharging the first power supply means by an amount equal to the drain during an average transmission.

5. A system as defined in claim 4 wherein the switching means further comprises first means for converting the voltage of the second power supply means to the voltage of the first power supply means.

6. A system as defined in claim 5 wherein the first converting means comprises a DC-to-DC voltage converter.

7. A system as defined in claim 3 wherein the second power supply means further comprises an AC power source.

8. A system as defined in claim 7 further comprising means for converting power derived from the AC power source to 5 VDC.

9. A system as defined in claim 8 wherein the converting means comprises a DC converter and a DC voltage regulator.

10. A system as defined in claim 9 wherein the set of programmed steps further comprises:
 determining whether power is being supplied to the system from the AC power source or from the personal computer power supply; and
 activating the switch means to switch power output from the AC power source to the first power supply means whenever power is being supplied to the system from the AC power source, otherwise activating the switch means to switch power output from the personal computer power supply to the first power supply means whenever power is being supplied to the system by the personal computer power supply but not by the AC power source, so as to recharge the first power supply means.

11. An electrical power management system comprising:
 radio transmitter means for transmitting packets of data;
 first power supply means, rechargeable, for storing electrical energy and supplying power to the radio transmitter means;
 second power supply means, self-contained, for storing electrical energy and supplying electrical current to recharge the first power supply means;

means for switching electrical current output from the second power supply means to the first power supply means so as to recharge the first power supply means;

processor means for controlling the recharging of the first power supply means by performing a set of programmed steps comprising:

detecting the transmission of a packet of data by the radio transmitter means;

deriving the amount of electrical energy consumed by the radio transmitter means during transmission of the packet of data;

computing a recharging time and power equal to the time and power required for the second power supply means to recharge the first power supply means so as to restore electrical energy to the first power supply means in an amount substantially equal to the amount of electrical energy consumed by the radio transmitter means during transmission of the packet of data;

activating the switch means to switch power output from the second power supply means to the first power supply means to restore said electrical energy; and program memory means for storing machine-readable instructions utilized by said processor means to carry out said set of programmed steps.

12. A system as defined in claim 11 wherein the radio transmitter means comprises a packet-switched data radio.

13. A system as defined in claim 11, wherein the first power supply means comprises a first rechargeable battery.

14. A system as defined in claim 13 wherein the first rechargeable battery has a higher power output than the second power supply means.

15. A system as defined in claim 11 wherein the first power supply means comprises a capacitor.

16. A system as defined in claim 11 wherein the second power supply means comprises the internal power supply of a personal computer.

17. A system as defined in claim 16 wherein the personal computer power supply has a lower power capacity than that of the first power supply means.

18. A system as defined in claim 11 wherein the voltage of the first power supply means is different from the voltage of the second power supply means.

19. A system as defined in claim 18 wherein the switching means further comprises first means for converting the voltage of the second power supply means to the voltage of the first power supply means.

20. A system as defined in claim 19 wherein the first converting means comprises a DC-to-DC voltage converter.

21. A system as defined in claim 16 wherein the second power supply means further comprises an AC power source.

22. A system as defined in claim 21 further comprising means for converting power derived from the AC power source to 5 VDC.

23. A system as defined in claim 22 wherein the converting means comprises a DC converter and a DC voltage regulator.

24. A system as defined in claim 23 wherein the set of programmed steps further comprises:

determining whether power is being supplied to the system from the AC power source and from the personal computer power supply; and activating the switch means to switch power output from the AC power source to the first power supply means whenever power is being supplied to the system from the AC power source, otherwise activating the switch means to switch power output from the personal computer power supply to the first power supply means whenever power is being supplied to the system by the personal computer power supply but not by the AC power source, so as to recharge the first power supply means.

25. A system as defined in claim 11 wherein the processor means comprises a programmable microprocessor.

26. A system as defined in claim 11 wherein the deriving step further comprises the steps of:

measuring the average rate at which the radio transmitter means consumes power during the transmission of the packet of data and the duration of the transmission of the packet of data; and multiplying the average energy consumption rate by the duration of the transmission.

27. A system as defined in claim 11 wherein the first power supply means comprises a capacitor having a capacitor storage voltage that is higher than the operating voltage of the second power supply means.

28. A system as defined in claim 11 wherein the processor receives power from the second power supply means.

29. A system as defined in claim 11 further comprising an initializing step comprising the steps of:

detecting an electrical energy level stored in the first power supply means;

activating the switch means to switch power output from the second power supply means to said first power supply means when the energy level of the first power supply means is less than a first predetermined energy level so as to recharge the first power supply means to said energy level; and deactivating the switch means to stop power output from the first power supply means to the second power supply means so as to stop recharging the first power supply means.

30. A system as defined in claim 29 wherein the detecting step comprises the step of placing an electrical test load on the first power supply means and measuring the voltage level on said means to compute the electrical energy level of the first power supply means.

31. A system as defined in claim 11 wherein the set of programmed steps further comprises the steps of:

monitoring the voltage level of the second power supply means; and modifying the power drain on the second power supply by adjusting the switch means to ensure the voltage level of the second power supply means does not become less than a predetermined voltage level.

32. An electrical power management system comprising:

an electrical appliance having a predetermined power demand;

first self-contained rechargeable power supply means, having a first power capacity that is equal to or greater than the predetermined power demand, for storing electrical energy and supplying power to the appliance;

second self-contained rechargeable power supply means, having a second power capacity that is less than the predetermined power demand for storing electrical energy and supplying electrical current to intermittently recharge the first power supply means;

voltage converter switch means for switching electrical current output from the second power supply means to the first power supply means and for converting the voltage output by the second power supply means to the voltage output by the first power supply means so as to recharge the first power supply means;

processor means for controlling the recharging of the first power supply means by performing a set of programmed steps comprising:

detecting the transmission of a packet of data by radio transmitter means;

deriving the amount of electrical energy consumed by the radio transmitter means during transmission of the packet of data;

activating the voltage converter switch means to switch power output from the second power supply means to restore said electrical energy in an amount substantially equal to the amount of energy used during transmission of the packet of data; and program memory means for storing machine-readable instructions utilized by said processor means to carry out said set of programmed steps.

33. A system as defined in claim 32 wherein the appliance comprises a packet-switched data radio.

34. A system as defined in claim 32 wherein the first power supply means comprises a first rechargeable battery.

35. A system as defined in claim 32 wherein the first power supply means comprises a capacitor.

36. A system as defined in claim 32 wherein the second power supply means comprises the internal power supply of a personal computer.

37. A system as defined in claim 32 wherein the voltage of the first power supply means is different than the voltage of the second power supply means.

38. A system as defined in claim 36 wherein the second power supply means further comprises an AC power source.

39. A system as defined in claim 38 further comprising means for converting power derived from the AC power source to 5 VDC.

40. A system as defined in claim 39 wherein the converting means comprises DC converter and a DC voltage regulator.

41. A system as defined in claim 38 wherein the set of programmed steps further comprises:

determining whether power is being supplied to the system from the AC power source and from the personal computer power supply; and activating the switch means to switch power output from the AC power source to the first power supply means whenever power is being supplied to the system from the AC power source, otherwise activating the switch means to switch power output from the personal computer power supply to the first power supply means whenever power is being supplied to the system by the personal computer power supply but not by the AC power source, so as to recharge the first power supply means.

42. A system as defined in claim 32 wherein the processor means comprises a programmable microprocessor.

43. A system as defined in claim 42 wherein the microprocessor receives power from the second power supply means.

44. A system as defined in claim 32 wherein the deriving step further comprises the steps of:

measuring the average rate at which the radio transmitter means consumes power during the transmission of the packet of data and the duration of the transmission of the packet of data; and multiplying the average energy consumption rate by the duration of the transmission.

45. A system as defined in claim 32 wherein the set of programmed steps further comprises the step of initializing the first power supply means each time the radio transmitter means is turned on.

46. A system as defined in claim 45 wherein the initializing step further comprises the steps of:

detecting an electrical energy level stored in the first power supply means;

activating the voltage converter switch means to switch power output from the second power supply means to said first power supply means when the energy level of the first power supply means is less than a first predetermined energy level so as to recharge the first power supply means to above said level; and deactivating the voltage converter switch means to stop power output from the first power supply means to the second power supply means so as to stop recharging the first power supply means.

47. A system as defined in claim 46 wherein the detecting step comprises the step of placing an electrical test load on the first power supply means and measuring the voltage level on said means to compute the electrical energy level of the first power supply means.

48. A system as defined in claim 32 wherein the set of programmed steps further comprises the steps of:

monitoring the voltage level of the second power supply means; and modifying the power drain on the second power supply by adjusting the voltage converter switch means to ensure the voltage level of the second power supply means does not become less than a first predetermined voltage level.

49. An electrical power management system for use with a portable personal computer and a computer peripheral, wherein the portable personal computer has a peripheral port powered by an internal battery powered power supply and wherein the peripheral requires power that exceeds the peak power capacity of the peripheral port supply but the average power requirements of the peripheral are less than the average power capacity of the peripheral power supply, the electrical power management system comprising:

first power supply means for storing electrical energy and supplying power to the peripheral;

means for switching electrical current output from the peripheral port supply of the personal computer to the first power supply means so as to recharge the first power supply means;

processor means for controlling the recharging of the first power supply means by performing a set of programmed steps comprising:

detecting the transmission of a packet of data by radio transmitter means;

deriving the amount of electrical energy consumed by the radio transmitter means during transmission of the packet of data; and activating the switch means to switch power output from the internal power supply of the personal computer to the first power supply means to restore said electrical energy in an amount substantially equal to the derived amount of electrical energy consumed during transmission of the pocket of data; and program memory means for storing machine-readable instructions utilized by said processor means to carry out said set of programmed steps.

50. A system as defined in claim 49 wherein the peripheral comprises a packet-switched data radio.

51. A system as defined in claim 49 wherein the first power supply means comprises a capacitor.

52. A system as defined in claim 49 wherein the voltage of the first power supply means is different than the voltage of the internal power supply.

53. A system as defined in claim 52 wherein the switching means further comprises first means for converting the voltage of the internal power supply to the voltage of the first power supply means.

54. A system as defined in claim 53 wherein the first converting means comprises a DC-to-DC voltage converter.

55. A system as defined in claim 49 wherein the processor means comprises a programmable microprocessor.

56. A system as defined in claim 49 wherein the deriving step comprises the steps:
 measuring the average rate at which the radio transmitter means consumes power during the transmission of the packet of data and the duration of the transmission of the packet of data; and
 multiplying the average energy consumption rate by the duration of the transmission.

57. A system as defined in claim 49 wherein the processor receives power from the internal power supply.

58. A system as defined in claim 51 wherein the storage voltage of the capacitor is greater than the operating voltage of the internal power supply.

59. A system as defined in claim 49 wherein the set of programmed steps further comprises the step of initializing the first power supply means each time the radio transmitter means is turned on.

60. A system as defined in claim 59 wherein the initializing step further comprises the steps of:
 detecting an electrical energy level stored in the first power supply means;
 activating the voltage converter switch means to switch power output from the second power supply means to said first power supply means when the energy level of the first power supply means is less than a first predetermined energy level so as to recharge the first power supply means to above said level; and
 deactivating the voltage converter switch means to stop power output from the first power supply means to the second power supply means so as to stop recharging the first power supply means.

61. A system as defined in claim 60 wherein the detecting step comprises the step of placing an electrical test load on the first power supply means to compute the electrical energy level of the first power supply means.

62. A system as defined in claim 49 wherein the set of programmed steps further comprises the steps of:
 monitoring the voltage level of the second power supply means; and
 modifying the power drain on the second power supply by adjusting the voltage converter switch means to ensure the voltage level of the second power supply means does not become less than a first predetermined voltage level.

63. An electrical power management system comprising in combination:
 a packet-switched data radio having a predetermined power demand and incorporating a first rechargeable battery having a power capacity equal to or greater than the predetermined power demand and having a first voltage rating, for storing electrical energy and supplying power to the packet-switched data radio;
 a portable personal computer incorporating a peripheral port powered by an internal battery powered power supply, said port having a power capacity less than the predetermined power demand and having a second voltage rating for storing electrical energy and supplying electrical current to intermittently recharge the first power supply means;
 voltage converter switch means, electrically coupled to both the first and second rechargeable batteries, for switching electrical current output from the second rechargeable battery to the first rechargeable battery and for converting the voltage output by the second rechargeable battery to the voltage output by the first rechargeable battery so as to recharge the first rechargeable battery;
 a programmable microprocessor, receiving power supplied from the second rechargeable battery, for controlling the recharging of the first rechargeable battery by performing a set of programmed steps comprising:
  initializing the first power supply means each time the radio transmitter means is turned on, the initializing step comprising the steps of:
   detecting an electrical energy level stored in the first power supply means;
   activating the voltage converter switch means to switch power output from the second power supply means to said first power supply means when the energy level of the first power supply means is less than a first predetermined energy level so as to recharge the first power supply means; and
   deactivating the voltage converter switch means to stop power output from the first power supply means to the second power supply means so as to stop recharging the first power supply means;
  replacing the electrical energy consumed by the radio transmitter following each transmission cycle, the replacing step comprising the steps of:
   detecting the transmission of a packet of data by radio transmitter means;
   deriving the amount of electrical energy consumer by the radio transmitter means during transmission of the packet of data; and
   activating the voltage converter switch means to switch power output from the second power supply means to the first power supply means to restore said electrical energy;
 program memory means for storing machine-readable instructions utilized by said processor means to carry out said set of programmed steps.

64. A system as defined in claim 63 wherein the set of programmed steps further comprises the steps of:
 monitoring the voltage level of the second power supply means;
 adjusting the voltage converter switch means to ensure the voltage level of the second power supply means does not become less than a first predetermined voltage level;
 repeating the monitoring step until the voltage of the second power supply means is not less than the first predetermined voltage level; and
 reenabling the voltage converter switch means.

65. An electrical power management system comprising:
 radio transmitter means for transmitting packets of data;
 first power supply means for storing electrical energy and supplying power to the radio transmitter means;
 second power supply means for storing electrical energy and supplying electrical current to recharge the first power supply means;

means for switching electrical current output from the second power supply means to the first power supply means so as to recharge the first power supply means;

means for controlling the recharging of the first power supply means by performing a set of programmed steps comprising:

detecting the transmission of data by the radio transmitter means; and activating the switch means to switch power output from the second power supply means to the first power supply means to charge the first power supply means by an amount substantially equal to the discharge occurring during transmission of the data packets thereby preserving the energy in the second power supply means by replacing the energy used by the first power supply means during transmission.

* * * * *